United States Patent [19]

Heiliger

[11] Patent Number: 5,348,425
[45] Date of Patent: Sep. 20, 1994

[54] PISTON CYLINDER DEVICE WITH A PROTECTIVE COATING AND METHOD OF PRODUCING SUCH A COATING

[76] Inventor: Robert W. Heiliger, Hochkoppel 11, 5166 Kreuzau-Untermaubach, Fed. Rep. of Germany

[21] Appl. No.: 974,270

[22] Filed: Nov. 10, 1992

[51] Int. Cl.⁵ .................. E21D 15/52; E02D 5/60
[52] U.S. Cl. .................. 405/297; 405/290; 405/288; 405/211.1
[58] Field of Search ............ 405/290, 292, 297, 288, 405/272, 211.1, 211; 422/6; 106/14.13, 14.15, 14.23, 14.43

[56] References Cited

U.S. PATENT DOCUMENTS

| | | | |
|---|---|---|---|
| 4,415,293 | 11/1983 | Engel et al. | 405/211.1 X |
| 4,614,461 | 9/1986 | Taniguchi et al. | 405/211.1 X |
| 4,619,557 | 10/1986 | Salama et al. | 405/211.1 |
| 4,640,650 | 2/1987 | Koppers et al. | 405/290 |
| 4,892,601 | 1/1990 | Norwood | 405/216 X |
| 4,921,555 | 5/1990 | Skiff | 405/216 X |
| 5,049,005 | 9/1991 | Lazare et al. | 405/216 |
| 5,051,039 | 9/1991 | Heiliger | |
| 5,087,154 | 2/1992 | Crawford | 405/216 |
| 5,175,973 | 1/1993 | Owen et al. | 405/216 X |

FOREIGN PATENT DOCUMENTS

| | | |
|---|---|---|
| 1769418 | 7/1958 | Fed. Rep. of Germany |
| 1812616 | 6/1970 | Fed. Rep. of Germany |
| 1202536 | 1/1960 | France |
| 893050 | 4/1962 | United Kingdom |

*Primary Examiner*—Randolph A. Reese
*Assistant Examiner*—J. Russell McBee
*Attorney, Agent, or Firm*—W. G. Fasse; W. F. Fasse

[57] ABSTRACT

A method is described for protecting piston cylinder devices against corrosion by a pressure resistant thermoset or cured material coating. At least the outer and inner cylindrical surfaces, for example, of a mine prop, that cooperate with a sealing device, are coated with a three-dimensionally cross-linked, cured or thermoset material having a sufficient thickness on the one hand for providing the intended protection against corrosion and on the other hand to avoid excessive radially directed elastic deformations of the coating. An additive is included in the coating to improve the dry lubricating characteristics, and thus the cooperation between the coating and the sealing devices. The three-dimensionally interlinked thermoset material fills all surface irregularities so that gas and water pockets, for example, in a mine prop, are avoided.

26 Claims, 2 Drawing Sheets

PISTON CYLINDER DEVICE WITH A PROTECTIVE COATING AND METHOD OF PRODUCING SUCH A COATING

FIELD OF THE INVENTION

The invention relates to a method for producing a piston cylinder device with a protective coating on at least one cylindrical inner surface and at least one cylindrical member, such as a piston having an outer cylindrical surface that slides relative to the inner cylindrical surface, so that the outer cylindrical surface is guided by the inner cylindrical surface. Such devices include at least one sealing ring operatively arranged between the inner and outer cylindrical surfaces. The ends of the cylindrical surfaces are sealed by mechanical seals for permitting the introduction of a fluid under pressure for causing the relative sliding movement. The invention also relates to a piston cylinder device of this type, especially a mine prop.

BACKGROUND INFORMATION

U.S. Pat. No. 5,051,039 (Heiliger), issued Sep. 24, 1991, relates to a hydraulic steel mine prop that constitutes a piston cylinder device of the type described above. The known mine prop comprises components that can be assembled cold without welding. Hence, high strength steel can be used for making these mine props. The absence of welding heat avoids adversely influencing the texture of the high strength steel. The known mine prop leaves room for improvement with regard to the protection of the outer and inner cylindrical surfaces and with regard to the reduction of friction between these two surfaces that slide relative to each other.

French Patent Publication 1,202,536 (Noé), published on Jan. 11, 1960, discloses a mine prop in which the inner and outer cylindrical surfaces that face each other are provided with a coating of synthetic material which may be of the thermoplastic or thermosetting type. The coating may have a layer thickness within the range of 1 to 4 mm. The coating in this French Publication may be applied, for example, by spraying, and requires a subsequent calibration. Thermoplastic coatings may, for example, be calibrated by a heated piston. The relatively thick coating of about 1 to 4 mm thickness may even be applied to an unworked surface to smooth out the surface roughness.

The use of thermoplastic synthetic materials for providing a protective coating on surfaces of a mine prop as taught by French Patent Publication 1,202,536 (Noé) has substantial disadvantages, because such materials are relatively permeable to oxygen and water vapor, whereby these media which are used as the pressure medium for operating the mine prop, tend to diffuse through the protective coating of a thermoplastic synthetic material, thereby reaching the interface between the thermoplastic material and the metal of which the mine prop is made. As a result, pockets containing water are formed at the interface. These pockets lead to corrosion and in time to the separation of the coating from the metal. As a result, it becomes impossible to operate such a mine prop under the pressures required for its operation. Another drawback of such thick synthetic material coating layers is seen in that the piston motion drives the above mentioned water pockets at the interface between the coating and the metal along the interface in the piston motion direction, thereby speeding-up the peeling of the coating. Further, it is even possible that such water pockets permit the piston to pass the pockets, so that pockets are formed behind the piston in the low pressure chamber. If this happens, the water pocket, which is in effect a water bubble, can explode in the low pressure chamber, thereby damaging the synthetic material coating. Another drawback of protective coatings of synthetic materials that are at least 1 mm thick, is the fact that the coatings are too elastic in the presence of high pressure. This applies to thermoplastic materials as well as to thermosetting materials. As a result, the pressure in the piston chamber compresses the coating in a radial direction to an extent that cannot be accommodated by the sealing elements between the piston and the piston enclosing wall surface, whereby maintaining the required high pressure, for example in a mine prop, becomes difficult if not impossible.

It appears that the French Patent Publication 1,202,536 wants to avoid using heat for applying the coating, whereby especially in connection with thermosetting materials, a cross-linking and evaporation of the solvent would take several months. The use of a solvent is apparently necessary for spraying the thermosetting material onto the relevant surfaces. On the other hand, if it is intended to cross-link the thermosetting material by the application of heat, substantial volumes of the solvent gases would have to be removed in an environmentally satisfactory manner. Another drawback is seen in the fact that it is difficult to apply coatings by spraying to a thickness of one to four mm thickness. In any event, the required calibration of these relatively thick coatings is an undesirable step.

In the French Patent Publication 1,202,536, even where the protection is intended to be accomplished by the insertion of a ready-made sleeve of the synthetic material, it is difficult to avoid sealing problems due to the elasticity of the synthetic materials having a thickness within the range of 1 to 4 mm. Furthermore, in mine props the pressure is applied to only one side of the piston and the opposite chamber is under low pressure. As a result, the formation of a radial step or bulge in the coating is unavoidable by the pressure application, due to the elasticity of the materials. Such a radial step in the coating is highly undesirable, because it would tend to damage the sealing rings between the piston and the cylinder wall.

In connection with mine props it was necessary to provide protection against corrosion by electroplating, especially where the mine props were intended to be operated by water as the pressure medium. As a result it was not possible to use high strength steels for making the components of the mine props, due to the hydrogen embrittlement of such high strength steel alloys. Thus, it has been conventional practice to make the mine props of lesser strength steel with the result that the mine props became even heavier, because the lesser strength steels required larger wall thicknesses. This problem has not entirely been solved by the conventional synthetic material coatings as taught in the above mentioned French Patent Publication 1,202,536, due to the drawbacks described above.

Another disadvantage of electroplating the components of mine props is seen in that the head and foot sections required welding which destroyed the electroplating protection coating. Where mine props with electroplated components have been used anyway, some protection against corrosion has been gained by adding an emulsion to the water used as the pressure medium. However, emulsions have their own drawbacks, especially environmental drawbacks.

Mine props constructed as described in the above mentioned U.S. Pat. No. 5,051,039 (Heiliger) avoid welding connections by using cold connections, thus making it possible to use high strength steels, whereby welding heat no longer adversely affects the strength of the steel. An additional advantage of the Heiliger mine prop is seen in that the use of high strength steels avoids the need for a material removing machining operation of the cylindrical surfaces that need to be protected. Merely a degreasing and/or descaling operation may be necessary.

British Patent 893,050 (Von Linsingen), published Apr. 4, 1962, discloses improvements in hydraulic pit or mine props wherein the inner surface of the cylinder is coated with a coating (16) that is resiliently deformable, yet resistant to corrosion, swelling, and aging, as well as wear and tear. The inner coating is, for example, ethoxylin resin or polyamide, which is a thermoplastic, in a sprayable solution which may contain a slip promoting agent, e.g. molybdenum disulphide. The sprayed on coating has a substantial thickness of about 0.1 mm to 5 mm or 25% to 50% of the wall thickness of the outer cylinder wall, and is thus capable of bulging in response to piston movements in the cylinder. German Patent Publication (DE-OS) 1,812,616 (Schulte et al.), published Jun. 18, 1970, discloses a hydraulic metal cylinder especially for mine props, wherein the inner surface of the cylinder is coated with a synthetic layer of synthetic material having a thickness of about 0.2 mm to about 0.6 mm. The reference teaches that the inner surface of the cylinder is spray-coated, whereby any possible roughness of the inner cylinder surface is coated over by the spray coat. This reference does not teach the kind of synthetic material nor does it address the problem of bulging.

German Utility Model Publication 1,769,418, (Remscheidt), registered Jul. 3, 1958, discloses a cylinder pipe for mine props with several coating layers on the inner and outer surfaces of the pipe. The layers are thickest on the pipe surfaces and thinner the further distant they are from the pipe. The layers are made of condensing and polymerizing synthetic materials. The layer thicknesses range from 20 to 50 μm. However, the problem of bulging is not addressed in this reference.

OBJECTS OF THE INVENTION

In view of the foregoing it is the aim of the invention to achieve the following objects singly or in combination:

to provide a method for applying a thermosetting coating to inner and/or outer surfaces of a piston cylinder device, especially a mine prop, wherein the coating is pressure resistant and avoids, or at least substantially reduces the frictional wear and tear of the non-metal sealing elements which are exposed to a sliding movement relative to the synthetic material coating;

to provide a coating which enables the operation of a mine prop with water as the pressure medium without the inclusion of lubricating additives to the water;

to avoid a calibration operation on the synthetic material coating altogether;

to avoid an elastic deformation of the coating material by the pressure medium in the pressure chamber of the device;

to make sure that the coating of a three-dimensionally cross-linked thermosetting material completely fills all depressions and recesses in the coated surface to prevent the formation of water pockets or gas pockets, thereby making the coating more durable by avoiding peeling of the coating;

to include in the three-dimensionally cross-linked thermosetting material a lubricant as an additive which does not participate in the cross-linking, but improves the lubrication between components of the piston cylinder device that move relative to each other; and to apply such a coating instead of an electroplated coating, to thereby avoid the hydrogen embrittlement of high strength steel components of such piston cylinder devices.

SUMMARY OF THE INVENTION

The coating is applied according to the invention by the following steps. First, at least the cylindrical surfaces which cooperate with a sealing ring, are roughly surface treated for example by sandblasting without any material removal machining operation. Second, a thermosetting dust or powder that has not yet been cross-linked, that is, it has not yet been cured, but is capable of a three-dimensional cross-linking, is mixed with graphite powder and/or molybdenum sulfide powder or similar lubricants which do not participate in the three-dimensional cross-linking, but which improve the dry lubricating characteristics. Lubricants are added within the range of 0.5 wt.% to 30 wt.% of the powder lubricant mixture, the remainder being thermosetting powder. Third, the roughly prepared surface is coated with the powder mixture to form a coating with a layer thickness within the range of about 100 μm to maximally 500 μm, preferably 250 μm. Fourth, the coating is heated to cause the three-dimensional cross-linking. It has been found that three-dimensionally cross-linked thermosetting materials, such as: epoxy resins cross-linked with for example, polyamines, polyamino derivatives, polyamido derivatives, polyisocyanates, carboxylic acid and anhydrides thereof, amino resins, phenolic resins, polyphenols, solid-amines and combinations of these cross-linking members, or polyesters cross-linked with isocyanates are substantially less elastic than thermoplastic materials. As a result, the pressure of the flow medium in the pressure chamber of the cylinder of the piston cylinder device cannot elastically deform the coating in a radial direction. Additionally, the coating of the invention is too thin for an elastic deformation. Thus, the invention prevents the formation of a wave in the coating that tended to be formed in conventional coatings by the motion of the piston in the cylinder, thereby promoting the peeling of the coating due to the flexing work imposed by the piston on a conventional coating. The invention avoids this problem entirely. The small elasticity of the three dimensionally cross-linked, cured thermosetting material in combination with the relatively thin layer thickness of the coating according to the invention, prevent the piston from causing flexing and deforming of the coating as the piston moves in the cylinder.

It has been found that thermosetting materials of various kinds as listed above are suitable for the present purposes, and these thermosetting materials can be applied as very fine powder or dust suitably mixed with various kinds of additives for improving the dry lubricating characteristic of the coating, whereby these additives do not participate in the three-dimensional cross-linking during the heating within the range of curing temperature of about 100° to 350° C. This type of coating makes sure that the powder particles initially fill any crevices or depressions in the surface to be coated, thereby preventing forming a coating that merely bridges surface irregularities, thereby forming pockets of water and/or gas inclusions. By filling the depressions or irregularities with the powder material prior to the cross-linking, it is assured that the following three-dimensional cross-linking by the application of heat tenaciously bonds the three-dimensionally cross-linked thermosetting material to the surface to be coated, including the irregularities in the surface. This feature is important because it prevents the formation of the above mentioned pockets and also avoids the application of the above mentioned flexing work by the piston moving within the cylinder. By avoiding the pockets, the peeling tendency is correspondingly reduced or even completely avoided. In spite of the relatively thin thickness of the coatings according to the invention, water vapor and oxygen cannot diffuse through these thin coatings, due to the three dimensional cross-linking during curing of the thermosetting materials. Thus, it now becomes possible to operate a mine prop with water as the pressure medium without requiring additives in the water.

The inclusion of the lubricating additives in the powder prior to the cross-linking, greatly reduces the wear and tear of any sealing rings in the piston cylinder device by reducing the friction resistance between the coating and the sealing element, such as an O-ring. Another advantage of the invention is seen in that the present coatings have a very small hysteresis characteristic. Further, lubricants in the water can be altogether avoided as mentioned above, and a subsequent calibration work is not necessary, due to the thin layer thickness as taught by the invention.

Yet another advantage of the invention using three-dimensionally cross-linked thermosetting materials is seen in the fact that a subsequent surface finishing is quite possible, for example, for the removal of any stria, by honing the coating surface. Such surface treatment is possible without any danger that the coating will peel from the coated surface. Thus, it is possible to repair these surfaces quickly and cost efficiently by a grinding or honing operation. It is important in this connection that a coating must not be too thick, because otherwise the coating becomes too elastic and such elasticity is to be avoided for the reasons as explained above, especially to prevent the formation of a flexing wave that travels in front of the moving cylinder and to avoid leaking. The preferred layer thickness is within the range of 150 to 250 $\mu$m. A layer thickness or coating thickness of more than 500 $\mu$m should be avoided.

Another important advantage of the present coating is seen in the protection that it provides against agressive media. Moreover, any galvanic action is prevented by the thermosetting, insulating material so that such coatings can also be applied to the surfaces of high strength steel without any danger of a hydrogren embrittlement that can be caused in high strength steel by galvanic action.

The three-dimensional cross-linking of the initially applied powder coating is accomplished by applying heat to the powder coating so that the powder coating is exposed to a temperature of about 200° C. The heat may be applied already during the powder coating or thereafter, and the temperature will be maintained until complete cross-linking has taken place. The cross-linking temperature will vary for different thermosetting powder materials. The spraying of such powders as such is well known.

A cylinder may, for example, be coated by using a cylindrical pipe section that is available as semifinished material. The pipe section is simply cut to the required length, deburred, and then properly coated, whereby a surface machining with material removal is not necessary. However, it may be desirable to clean the surface by removing any fat or oil and scale. For this purpose, it is sufficient to simply dip the pipe section into a solvent or treat the surface by brushing or sandblasting. Thus, high strength steel pipes produced by cold drawing can be coated according to the invention, without the danger of hydrogen embrittlement. Such embrittlement was unavoidable heretofore, where coatings have been applied by electroplating techniques. The use of cold drawn high strength steel pipes for the manufacture of hydraulically operated mine props has thus become possible for the first time according to the invention.

The powder coating and cross-linking may be applied to all cylindrical surfaces, namely inner cylindrical surfaces and outer cylindrical surfaces of piston cylinder devices and the like, including surfaces equipped with sealing rings or other sealing elements that are slidingly engaged between two such surfaces. The present teaching is also applicable to protecting piston rods on their outer surfaces. A coating layer within the range of 150 to 250 $\mu$m has been found to be adequate, even for protecting the outer surface of piston rods.

Mine props can be efficiently produced according to the invention by coating the inner cylindrical surface of the outer cylindrical pipe section, and the outer cylindrical surface of the inner cylindrical pipe section. The type of coating taught herein is especially suitable for using cold drawn high strength steel for both the inner and the outer section of a mine prop while simultaneously avoiding a material removing machining operation. Such a mine prop can be operated with water as a pressure medium, and even salt water or very hard water containing minerals in solution can be used for operating the mine props according to the invention, since the lubricating additives avoid friction problems. The avoidance of adding an emulsion to the water that has been used heretofore as a pressure medium for operating mine props is yet another advantage of the present invention, because such emulsions are environmentally undesirable, since they can contaminate the water supply.

BRIEF DESCRIPTION OF THE DRAWINGS

In order that the invention may be clearly understood, it will now be described, by way of example, with reference to the accompanying drawings, wherein.

DETAILED DESCRIPTION OF A PREFERRED EXAMPLE EMBODIMENT AND OF THE BEST MODE OF THE INVENTION

Figure 1:
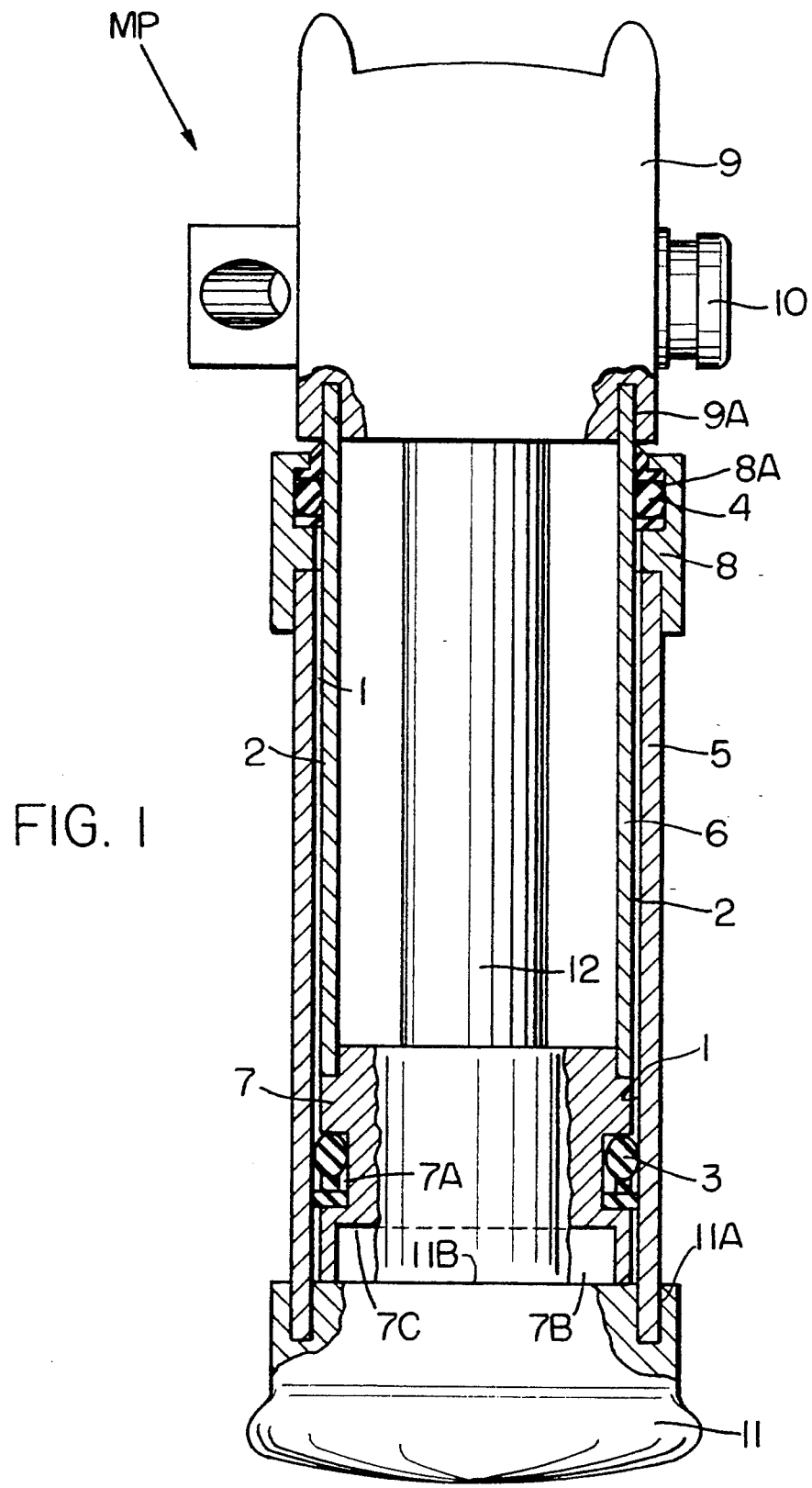
FIG. 1 illustrates a longitudinal axial section through a mine prop provided with protective coatings according to the invention.

Referring to FIG. 1, a mine prop MP comprises a head section 9, having installed therein a conventional setting and withdrawal valve 10. The mine prop MP also comprises a foot section 11 carrying in a sealed groove 11A an outer cylindrical pipe section 5. The head section 9 carries in a cylindrical sealed groove 9A an inner cylindrical pipe section 6. Conventional sealing adhesives are used to secure the pipe sections 5 and 6 in their respective grooves 11A and 9A. The inner pipe section 6 is axially movable up and down within the outer pipe section 5 in a sealed manner with the aid of two sealing devices 3 and 4. The inner pipe section 6 carries at its inner end a piston 7 provided with a radially outwardly facing circumferential groove 7A holding the sealing device 3 so that it will contact the inwardly facing surface of the outer pipe 5 in a sealing manner. The inwardly and downwardly facing end of the piston 7 forms a chamber 7B between its downwardly facing surface 7C and the upwardly facing surface 1ib of the foot section 11. This chamber 7B may be pressurized to extend the prop axially for its installation. A pressurized medium such as water is supplied through the valve 10 and a central pipe 12. The upper end of the outer pipe 5 carries an end bushing 8 provided with a radially inwardly facing groove 8A in which the second sealing device 4, such as an O-ring or the like, is received to seal the gap between the outer pipe section 5 and the inner pipe section 6. The sealing device 4 presses against the outer surface of the inner pipe 6 to provide the required seal. The sealing device 3 slides relative to the inner surface of the outer pipe 5. The sealing device 4 slides on the outer surface of the inner pipe section 6.

The central pipe 12 is arranged between the head section 9 and the piston 7. Water under pressure is passed through the setting and withdrawal valve 10 through the pipe 12 into the chamber 7B. This construction which secures the head section to the pipe 6 and the foot section to the pipe 5 by a conventional synthetic material or adhesive which forms simultaneously a seal, avoids any welding operation so that the components of the prop can be made of high strength steel that is cold drawn. The resulting surface, however, is not suitable for cooperation with the sealing devices 3 and 4 because the cold drawn surface is relatively rough. The invention solves this problem in an economical yet durable and even repairable manner by providing tough surface coatings 1 and 2 as described. Specifically, the surfaces of the cold drawn components are merely cleaned, for example degreased and sandblasted and then coated with a three-dimensionally cross-linking thermosetting material. Such coatings 2 and 1 are primarily applied to the outer cylindrical surface of the inner pipe 6 and to the inner cylindrical surface oft he outer pipe 5. The coating thickness is so selected that the initially rough dimensions of the pipe surfaces, plus the applied coating, results directly in the finish dimension required for a proper seal with the sealing devices 3 and 4. Additionally, the dimensions are so selected that the coating layer thickness is suitable for making subsequent repairs, for example, by a honing operation on the respective surfaces.

For this purpose the cylindrical inner surface coating 1 is a coating that cooperates directly with the sealing device 3 and the outer surface coating 2 of the inner cylinder 6 is a respective coating that cooperates with the sealing device 4.

The coating thickness is within the range of 150 to 500 $\mu$m, preferably 250 $\mu$m which is sufficiently thin that the elasticity in the radial direction, that is perpendicularly to the respective surface, is so small that the pressure application for setting the mine prop will not cause any leaks.

Other advantages of the invention are seen in that a mine prop as protected according to the invention can now be operated by water alone without the conventional additive. Thus, the costs for the oil to make the emulsion are avoided with the additional advantage that an environmentally unacceptable disposition of used emulsion is also avoided. Further, the costs of an expensive surface machining of the cylinder pipe sections are also avoided. According to the invention the surface coating as taught herein has a sufficient surface quality to provide a sliding seal while simultaneously providing a corrosion resistance, for example, against salt water or other minerals in solution in the water. By adding the above mentioned lubricants to the thermosetting material, a dry lubrication is advantageously achieved. The small thickness of the protective coating of the invention avoids the formation of an elastic wave that travels in front of the moving piston.

In spite of the small thickness of the layer according to the invention, the thermosetting material of the coating is still sufficiently elastic so that the coating cannot be damaged even if the prop itself should be elastically deformed under load conditions. The protective coating according to the invention can be applied with a layer thickness that is sufficient to avoid on the one hand the machining of the tubes or pipes while still providing the possibility of repairing minor damages by honing the surface. It has been found that a layer thickness within the range of 150 to 500 $\mu$m is sufficient for the present purposes, thereby avoiding an elasticity perpendicularly to the coated surface that might otherwise cause the above wave of the coating travelling in front of the moving piston. Another important advantage of the invention is seen in that the surface treatment by electroplating is completely avoided so that high strength steel can be used. Thus, hydrogen embrittlement is avoided in this way. The surface of the coating is smooth and the additives taught by the invention provide for an effective cooperation with conventional sealing devices 3, 4. Thus, the wear and tear of the seals is minimized.

Figure 2:
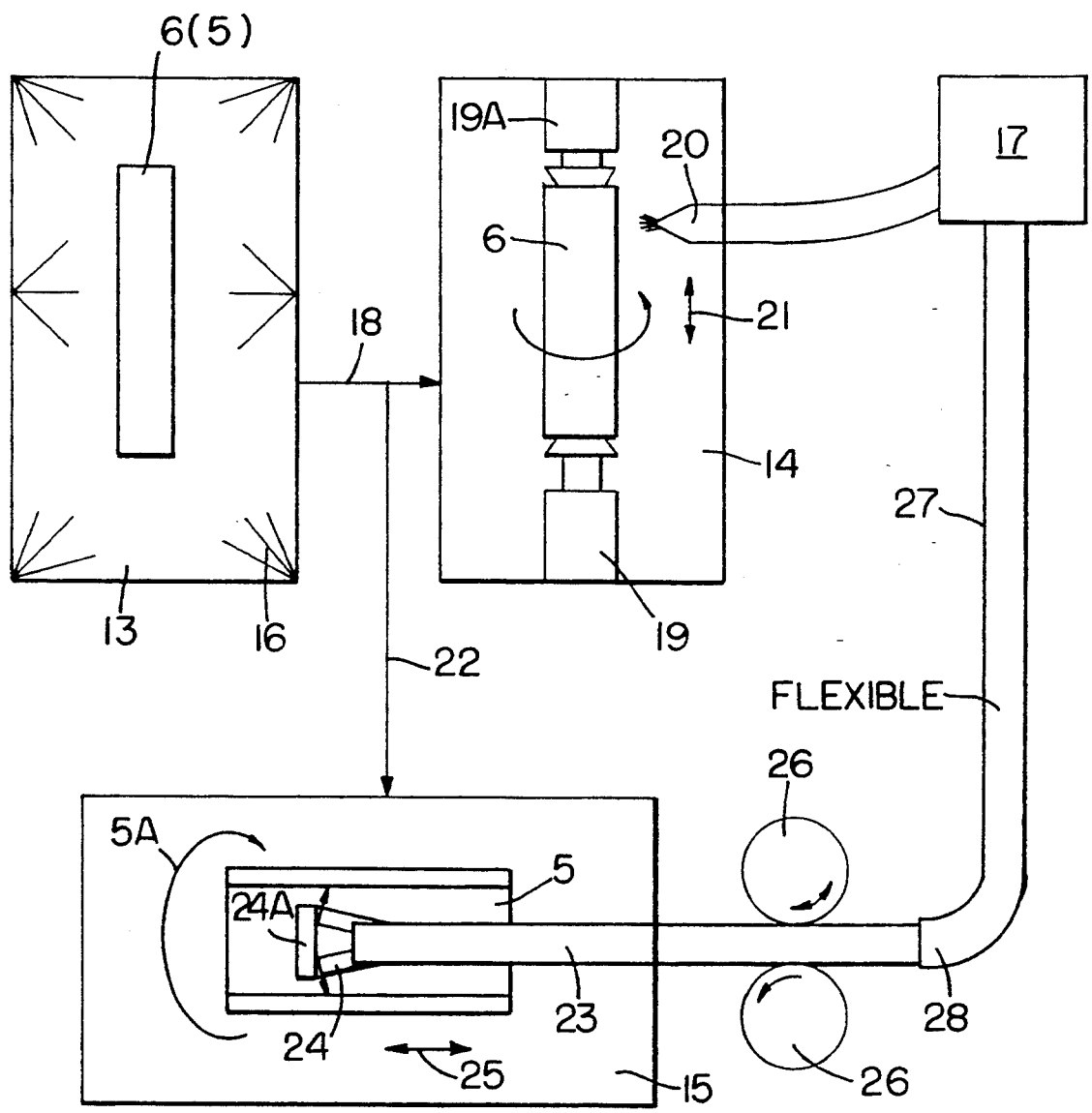
FIG. 2 illustrates schematically the operational sequence of steps for the coating according to the invention.

Referring to FIG. 2, a pipe section 5, 6 for a mine prop is placed into an oven 13 which is kept at a suitable temperature, for example 300° C. This temperature is sufficient to degrease and descale the sections 5, 6 and this cleaning operation may be enhanced by sandblasting jets 16.

The heated and cleaned section 6 is moved as indicated by the arrow 18 into a chamber 14 where the pipe section 6, to be coated on its outer surface is mounted for rotation between arbors 19, 19A. At least one spraying nozzle 20 movable within the chamber 14 up and down as indicated by the double arrow 21 along the length of the rotating section 6, is connected to a powder supply 17 containing thermosetting powder materials. As the heated section 6 rotates, the powder material is sprayed through the nozzle 20 onto the heated outer surface. The coating thickness is determined by the mass through-flow through the nozzle 20, by the rotational speed of the pipe, and by the speed of the movement in the direction of the arrow 21. The heat stored in the section 6 is sufficient to cause an immediate curing of the sprayed-on powder lacquer containing a lubricant not participating in the curing.

In order to also coat internal surfaces of the pipe section 5, the section 5 is moved from the oven 13 as indicated by the arrow 22 into a chamber 15 in which the section 5 is also rotated as indicated by the arrow 5A. A spray nozzle 24 is horizontally or axially movable back and forth as indicated by the arrow 25 by a drive mechanism 26 that moves the pipe 23 to which the nozzle 24 is secured. The pipe 23 is connected through a hose 27 or the like and a coupling 28 to the supply 17 of thermosetting material.

The pipe 23 with its nozzle 24 is known as a spraying lance and is equipped with a head plate 24A so that the spray is directed radially outwardly, as indicated, to cover the inner surface of the section 5. The rotation speed of the section 5 is selected so that the centrifugal force tends to hold the sprayed powder on the inner surface of the heated pipe 5. Additionally, the heat is sufficient to immediately start the curing of the thermosetting material. By moving the lancet 23 back and forth as indicated by the arrow 25, the entire inner surface of the section 5 is uniformly coated, whereby the drive of the drive wheels 26, which may, for example, be friction wheels, is so selected that the movement of the lancet in combination with the through-flow through the nozzle 24 provides the desired uniform thickness of the coating on the entire coated surface.

Although the invention has been described with reference to specific example embodiments, it will be appreciated that it is intended to cover all modifications and equivalents within the scope of the appended claims.

What I claim is:

1. A method for producing a protective thermoset coating at least on one surface that cooperates with a sealing device in a piston cylinder unit wherein said at least one surface is in sliding contact with said sealing device, comprising the following steps:
   (a) preparing a powder mixture of a three-dimensionally cross-linking thermosetting uncured powder material and a lubricant additive in powder form,
   (b) roughly preparing said at least one surface to provide a prepared surface for a powder coating operation,
   (c) applying a layer of said powder mixture to said prepared surface to form a powder coating layer on said prepared surface, and
   (d) heating said powder coating layer sufficiently for curing said thermosetting powder material to cause a three-dimensional cross-linking to form said protective thermoset coating with a coating thickness of about 500 μm at the most.

2. The method of claim 1, wherein said three-dimensionally cross-linking thermosetting powder material is selected from the group consisting of epoxy resins cross-linked with polyamines, polyamino derivatives, polyamido derivatives, polyisocyanates, carboxylic acid and anhydrides thereof, amino resins, phenolic resins, polyphenols, solid amines and combination of these cross-linking members, and polyesters cross-linked with isocyanates, and wherein said lubricant is selected from the group consisting of graphite, molybdenum sulfide, soot, polyethylene, polypropylene, polyamide, fluorine containing polymers, and silicone oil.

3. The method of claim 1, wherein said thermosetting powder material is present in said powder mixture within the range of 70% by weight to 99.5% by weight, and wherein said lubricant in powder form is present within the range of 0.5% by weight to 30% by weight of the whole powder mixture.

4. The method of claim 1, wherein said at least one surface is a surface selected from the group consisting of a cylindrical outer surface of a piston of said unit and a cylindrical inner surface of a cylinder of said unit, and wherein said step of preparing said at least one surface is performed as a cleaning step without any material removal machining.

5. The method of claim 4, wherein said step of preparing said at least one surface is performed by cutting a section off a cold drawn high strength steel pipe and cleaning an inner surface of said cold drawn high strength steel pipe section.

6. The method of claim 1, wherein said step of preparing said at least one surface is performed as a cleaning step by sandblasting.

7. The method of claim 1, wherein said step of preparing said at least one surface is performed as a cleaning step by brushing.

8. The method of claim 1, wherein said step of preparing said at least one surface is performed as a cleaning step by descaling.

9. The method of claim 1, further comprising preheating said at least one surface to a temperature within the range of about 100° C. to about 350° C. to store heat in said at least one surface sufficient for performing said heating of said powder in step (d) by causing a substantially immediate curing of said thermosetting powder when it is applied in step (c) to form said protective thermoset coating.

10. The method of claim 1, wherein said step of heating is performed by heating said at least one surface and said powder coating layer together to a temperature within the range of about 100° C. to about 350° C. to supply heat sufficient for a substantially immediate curing of said thermosetting powder to form said protective thermoset coating.

11. The method of claim 1, wherein said step of heating is performed by applying induction heat to said at least one surface.

12. The method of claim 1, wherein said protective thermoset coating is formed with a thickness within the range of about 150 μm to about 500 μm.

13. A piston cylinder device, comprising an outer cylindrical pipe section with an inwardly facing first cylindrical surface and a piston with an outwardly facing second cylindrical surface, sealing means in sliding contact with at least one of said first and second cylindrical surfaces, a protective thermoset, cured coating of a three-dimensionally cross-linked powder-based thermosetting material including a lubricant additive in said coating on at least one of said first and second cylindrical surfaces for improving a dry sliding characteristic of said sliding contact, said coating having a thickness within the range of about 100 μm to about 500 μm, said lubricant additive being dispersed and embedded in said coating, said thermoset, cured coating comprising macro-molecules formed by said three-dimensional cross-linking and said cured coating being substantially non-compressible and substantially impervious to gases, water and water vapor.

14. The piston cylinder device of claim 13, wherein at least said pipe section is a length of a cold drawn, high strength steel, of which said inwardly facing first cylindrical surface carries said thermoset, cured coating of said thermosetting material with said lubricant embedded in said thermosetting material.

15. The piston cylinder device of claim 13, wherein said outer cylindrical pipe section comprises a length of cold drawn, high strength steel, and wherein said piston also comprises a length of cold drawn, high strength steel to form a mine prop, and wherein said thermoset, cured coating is carried on said first and second cylindrical surfaces.

16. The piston cylinder device of claim 13, wherein said coating has a thickness within the range of about 150 μm to about 500 μm.

17. The piston cylinder device of claim 13, wherein said thermosetting material of said thermoset, cured three-dimensional cross-linked coating is selected from the group consisting of: epoxy resins cross-linked with polyamines, polyamino derivatives, polyamido derivatives, polyisocyanates, carboxylic acid and anhydrides thereof, amino resins, phenolic resins, polyphenols, solid amines and combinations of these cross-linking members, and polyesters cross-linked with isocyanates, and wherein said lubricant additive is selected from the group consisting of graphite, molybdenum disulfide, soot, polyethylene, polypropylene, polyamide, fluorine containing polymers, and silicone oil.

18. A mine prop, comprising a piston cylinder device including at least one outer cylindrical pipe (5) and an inner cylindrical pipe (6) slidingly guided in said outer cylindrical pipe, a piston (7) connected to an inner end of said inner cylindrical pipe, piston sealing means (34) in sliding, guided contact with an inner surface of said outer cylindrical pipe (5), at least one further sealing means (4) in sliding contact with an outer surface of said inner cylindrical pipe (6), a sleeve ring (8) connecting said further sealing means (4) with an upper end of said outer cylindrical pipe (5), a first protective, thermoset coating at least on said inner surface of said outer cylindrical pipe, a second protective, thermoset coating at least on said outer surface of said inner cylindrical pipe, each of said first and second protective coatings comprising a thermoset, cured coating of a three-dimensionally cross-linked powder-based thermosetting material including a lubricant additive in said coating on at least one of said first and second cylindrical surfaces for improving a dry sliding characteristic of said sliding contact, said coating having a thickness within the range of about 100 μm to about 500 μm, said lubricant additive being dispersed and embedded in said coating, said thermoset, cured coating comprising macromolecules formed by said three-dimensional cross-linking and said cured coating being substantially non-compressible and substantially impervious to gases, water and water vapor.

19. The mine prop of claim 18, wherein said coating has a thickness within the range of about 150 μm to about 500 μm.

20. The mine prop of claim 18, wherein said mine prop is made of cold drawn, high strength steel.

21. The method of claim 1, wherein said lubricant additive participates in said three-dimensional cross-linking.

22. The method of claim 1, wherein said lubricant additive does not participate in said three-dimensional cross-linking.

23. The device of claim 13, wherein said lubricant additive participates in said three-dimensional cross-linking.

24. The device of claim 13, wherein said lubricant additive does not participate in said three-dimensional cross-linking.

25. The mine prop of claim 18, wherein said lubricant additive participates in said three-dimensional cross-linking.

26. The mine prop of claim 18, wherein said lubricant additive does not participate in said three-dimensional cross-linking.

* * * * *

UNITED STATES PATENT AND TRADEMARK OFFICE
CERTIFICATE OF CORRECTION

PATENT NO. : 5,348,425
DATED : Sep. 20, 1994
INVENTOR(S) : Robert W. Heiliger It is certified that error appears in the above-identified patent and that said Letters Patent is hereby corrected as shown below:

Column 3, line 28, after "cylinder." insert a paragraph spacing;
         line 44, after "and" insert --get--;
Column 7, line 17, replace "lib" by --11B--;
         line 51, replace "oft he" by --of the--;
Column 8, line 6, before "additive" insert --emulsion--;
Column 9, line 10, replace "lance" by --lancet--.

Signed and Sealed this

Thirty-first Day of January, 1995

BRUCE LEHMAN

*Attest:*

*Attesting Officer*   *Commissioner of Patents and Trademarks*